United States Patent [19]

Minich

[11] Patent Number: 6,022,245
[45] Date of Patent: Feb. 8, 2000

[54] FILTERED MODULAR CONNECTOR

[75] Inventor: Steven Minich, Carlisle, Pa.

[73] Assignee: The Whitaker Corporation, Wilmington, Del.

[21] Appl. No.: 09/086,626

[22] Filed: May 29, 1998

[51] Int. Cl.$^7$ .................................................. H01R 13/66
[52] U.S. Cl. ........................................................... 439/620
[58] Field of Search .................................. 439/620, 676, 439/540.1, 541.5, 536; 361/728

[56] References Cited

U.S. PATENT DOCUMENTS

| | | | |
|---|---|---|---|
| 3,750,085 | 7/1973 | Petersen et al. | 338/220 |
| 4,600,256 | 7/1986 | Anttila | 339/17 M |
| 4,674,809 | 6/1987 | Hollyday et al. | 339/92 |
| 4,726,638 | 2/1988 | Farrar et al. | 439/620 R |
| 4,772,224 | 9/1988 | Talend | 439/607 |
| 5,015,204 | 5/1991 | Sakamoto et al. | 439/620 |
| 5,069,641 | 12/1991 | Sakamoto et al. | 439/620 |
| 5,178,554 | 1/1993 | Siemon et al. | 439/188 |
| 5,254,973 | 10/1993 | Gilmore, II | 340/547 |
| 5,360,353 | 11/1994 | Kinoshita | 439/620 |
| 5,403,207 | 4/1995 | Briones | 439/620 |
| 5,503,572 | 4/1996 | White et al. | 439/676 |
| 5,587,884 | 12/1996 | Raman | 361/728 |
| 5,647,767 | 7/1997 | Scheer et al. | 439/620 |
| 5,736,910 | 4/1998 | Townsend et al. | 333/181 |

OTHER PUBLICATIONS

Patent Abstracts of Japan; Application No. 02197241, Publication No. 04082181A, dated Mar. 16, 1992.

Anaheim, California, Sep. 22–24, 1997 Anaheim Marriott Hotel, 30$^{th}$ Annual Connector and Interconnection Symposium and Trade Show, International Institute of Connector and Interconnection Technology, Inc.— Modular Connector System for High Speed Applications, by Yakov Belopolsky, James A. Somerville, Berg Electronics, pp. 285–297.

*Primary Examiner*—Gary F. Pauman
*Assistant Examiner*—Alexander Gilman

[57] ABSTRACT

A modular connector includes a housing 1 having at least one plug receiving cavity 2. An edge connector 3 is disposed in the housing 1 and makes electrical connection to a receiving printed circuit board through solder tails 7. A printed circuit board 4 has electrical circuitry 16 and is received by the edge connector 3. Terminals 8 are held in the plug receiving cavity 2 of the housing 1 by a retainer 9. Ends of the terminals 8 distal from a mating side 50 of the connector make resilient contact to area contacts 6 on printed circuit board 4.

4 Claims, 2 Drawing Sheets

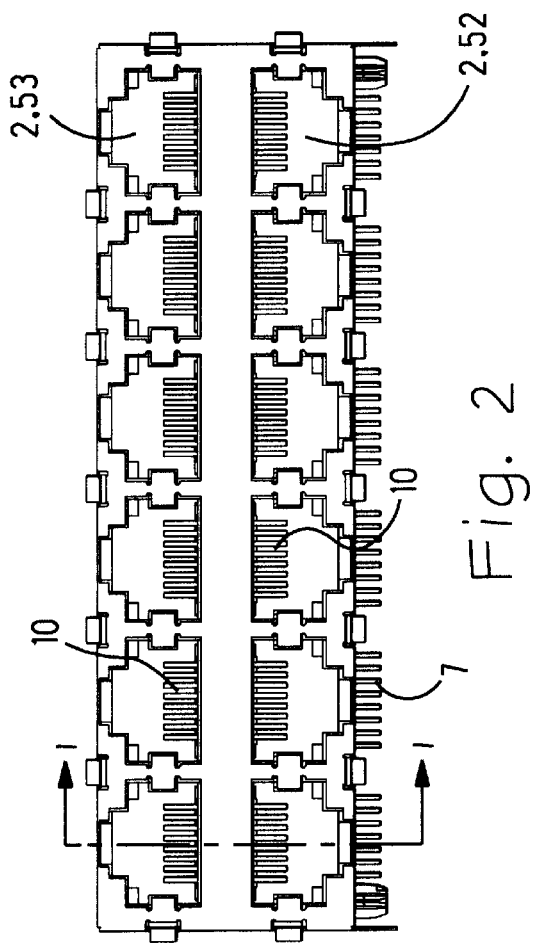
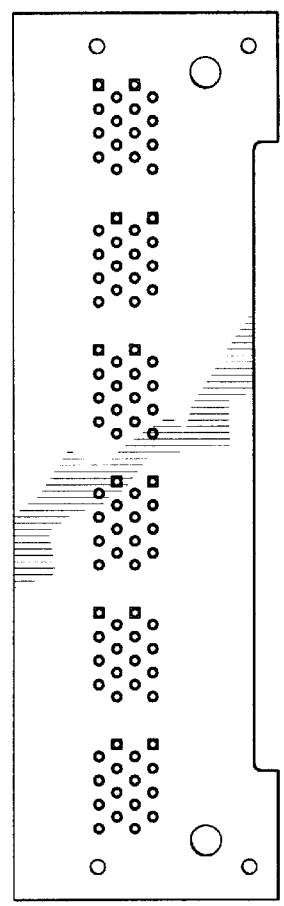
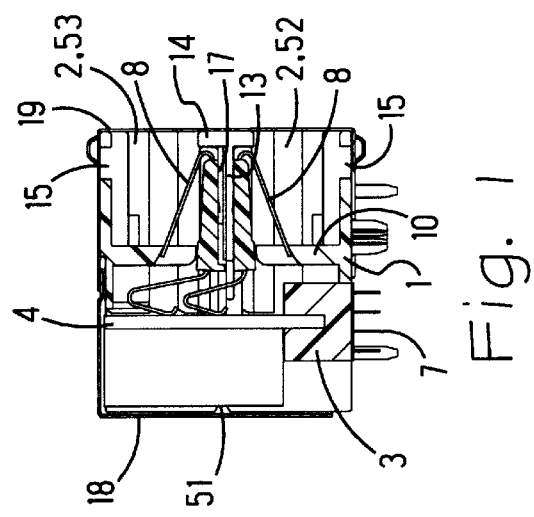
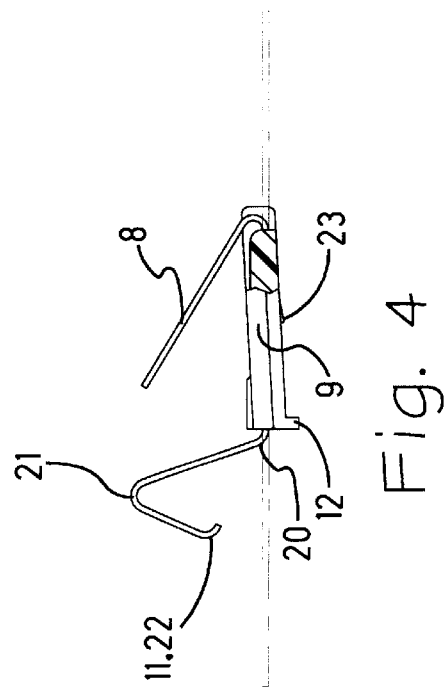

6,022,245

FILTERED MODULAR CONNECTOR

FIELD OF THE INVENTION

The present invention relates to the field of modular connectors and more particularly to the field of filtered modular connectors.

BACKGROUND OF THE INVENTION

Modular connectors are known and are used in the industry for telephone and data communication. It is also known to mount these modular connectors onto a printed circuit board that is a constituent part of a computer. The modular connectors are mounted onto one or more of the printed circuit boards of the computer that receive and transmit incoming and outgoing data signals. As the digital speeds of communication increase, there is a commensurate need to protect the integrity of the communication signal as well as shield the rest of the circuitry in the computer from electromagnetic emissions resulting from the signal. One method of providing such integrity is to filter out noise and other undesirable frequency components using analog or digital filtering techniques. While the addition of filtering circuitry provides improved signal integrity, it comes at the cost of additional space and bulk of the filtered connection.

U.S. Pat. No. 5,069,641 issued to Sakamoto et al. addresses the desirability of filtering a modular connector in a compact format by placing the filtering components internal to the connector itself. Disadvantageously, however, the filter components are permanently fixed to the connector and a receiving printed circuit board substrate to which it is mounted, adding cost to assembly and repair. In addition, the connector disclosed in the '641 patent is a single position. There is a further need for a multiple position data connector that makes efficient use of available space.

SUMMARY

It is an object of the present invention to address the foregoing stated disadvantages of the prior art by providing a filtered modular connector that makes efficient use of available printed circuit board space, is easily assembled, and repairable.

A modular connector comprises a housing, terminals and a printed circuit board substrate disposed in the housing. The circuit board has an electrical circuit and electrical contacts thereon and the terminals make electrical contact with the contacts on the printed circuit board substrate. An edge connector is disposed in the housing and receives the circuit board substrate.

Advantageously, a filtered modular connector makes efficient use of available printed circuit board space to which the connector is mounted, and is easily assembled and repaired. A further advantage is that a filtered modular connector can be upgraded or otherwise modified without replacing the entire unit.

BRIEF DESCRIPTION OF THE DRAWINGS

Embodiments according to the teachings of the present invention will now be described by way of example with reference to the following drawings in which:

FIG. 1 is a cross sectional view of a dual high embodiment of a modular connector according to the teachings of the present invention.

FIG. 2 is a front plan view of a dual high, 6 across embodiment of a modular connector according to the teachings of the present invention looking into a plurality of plug receiving cavities.

FIG. 3 is a suggested printed circuit board layout for the embodiment of the modular connector shown in FIG. 2.

FIG. 4 is a cross sectional view of terminals for use in a second row of an embodiment of a modular connector according to the teachings of the present invention.

DETAILED DESCRIPTION

Figure 6:
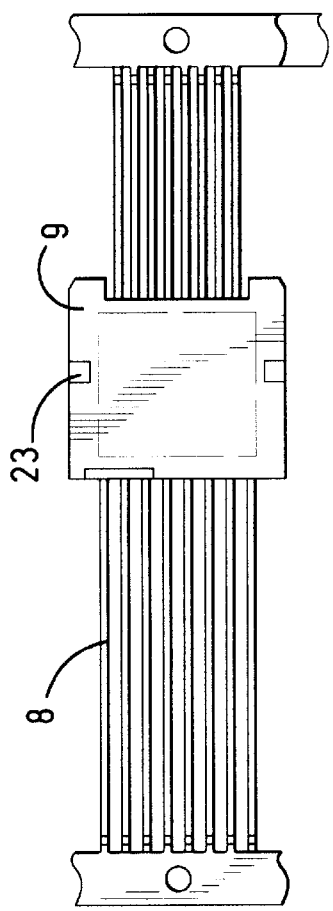
FIG. 6 is a cross sectional view of a housing of the embodiment of the modular connector shown in FIG. 1 of the drawings.

With specific reference to FIGS. 1 and 6 of the drawings, there is shown a dual high embodiment of a modular connector according to the teachings of the present invention in which a housing 1 comprises a generally rectilinear three dimensional structure with a dual high, six position across series of plug receiving cavities 2. An edge connector 3 is positioned within the housing 1 toward a nonmating side 51 of the connector and along a first row 52 of the plug receiving cavities 2. The edge connector 3 further has solder tails 7 extending therefrom, to enable a soldered connection to a receiving printed circuit board substrate (not shown) in a footprint and layout as shown in FIG. 3 of the drawings. The first row 52 of plug receiving cavities 2 has a internal geometry including a latch tab recess 15 to receive a conventional latch tab (not shown) of a mating RJ style connector with the latch tab adjacent the receiving printed board substrate in a "tab down" orientation. A second row 53 of cavities 2 has an internal geometry including the latch tab recess 15 to receive a conventional latch tab of a mating RJ style connector with the latch tab in a "tab up" orientation. The first and second rows 52,53 of cavities are defined within the housing 1 and are separated from each other by an intermediate wall 13. In a dual high, N across embodiment, this tab up/tab down configuration on opposite sides of the intermediate wall 13 where the latch tab recesses 15 are oriented away from each other, makes unlatching and removal of the mating connector easier for a person to perform than if the latch tab recesses 15 were oriented close to the intermediate wall 13 orienting the latch tabs toward each other.

Figure 8:
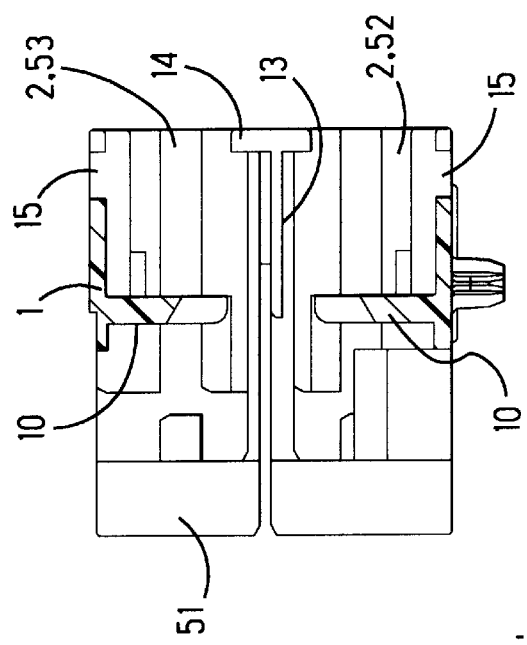
FIG. 8 is a plan view of terminals and retainer for use in a filtered modular connector according to the teachings of the present invention.

Disposed internal to the housing 1 and associated with each plug receiving cavity 2 is one of a plurality of groups of electrically conductive terminals 8. In the disclosed embodiment, there are eight individual terminals 8 in the group. Each terminal 8 in the group is held in parallel and separated relationship to each other by a plastic molded terminal retainer 9. There is one terminal retainer 9 and group of terminals 8 associated with each one of the plug receiving cavities 2. The terminal retainer 9 is overmolded onto the group 8 of terminals resulting in the structure of retainer 9 and terminals 8 shown in phantom representation in FIGS. 4, 5, and 8 of the drawings. Each terminal 8 is then bent around the retainer 9 for receipt by the housing 1. On a mating side 50 of the terminal retainer 9, each terminal in the group 8 is bent approximately 145 degrees relative to the retainer 9 to form a "comb" of terminals 8. The ends of the comb are received in a separator 10 which is part of the housing 1. Ends of each terminal 8 are disposed in a respective recessed area of the separator 10. Each terminal 8, as received in the recessed area of the separator 10, is flanked on each side by a protruding portion of the separator 10. The terminals 8 as received by the separator 10 and housing 1, therefore, comprise alternating nonconductive housing 1 and conductive terminal 8. On a nonmating side 51 of the retainer 9, each terminal has a first radius 20 bend with respect to the retainer 9 and is bent back over itself with a second radius bend 21 forming a spring. The spring provides for resilient engagement with a surface of a substrate when subject to a force vector on the spring in a direction parallel to the portion of the terminal 8 held by the retainer 9. The tip of each terminal 8 distal from the retainer has a third radius 22 to form a smooth contact point 11 toward the substrate which encourages uninhibited travel along the substrate surface as the substrate moves in a direction transverse to the direction parallel to the portion of the terminal 8 held by the retainer 9. The spring configuration of each terminal 8 enables separable contact with area contacts 6 on the printed circuit board 4 as will be further discussed below.

Figure 5:
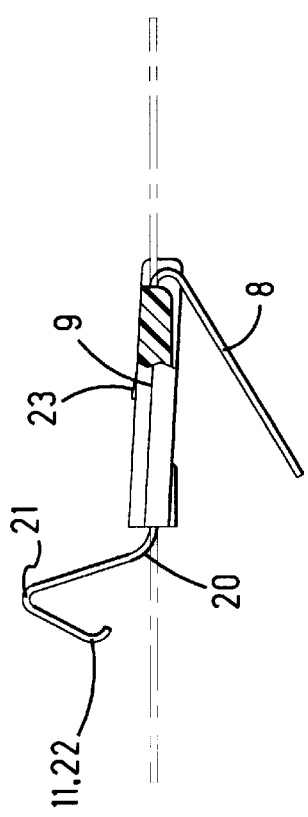
FIG. 5 is a cross sectional view of terminals for use in the first row of an embodiment of a modular connector according to the teachings of the present invention.
Figure 7:
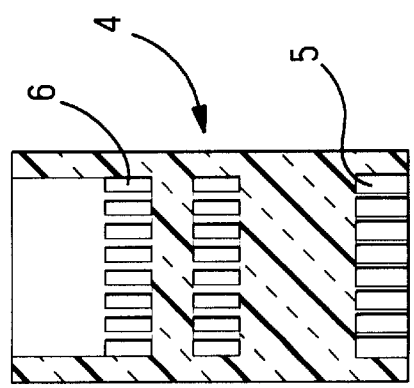
FIG. 7 is a plan view of a printed circuit board configured for disposal in the housing shown in FIG. 6.

With specific reference to FIGS. 1 and 5 of the drawings, for the retainers 9 configured for installation in the first row 52 of plug receiving cavities, there is shown the terminals 8 bent in a configuration as previously described. In the illustrated embodiment, the first row retainer 9 terminal configuration is distinguished by a 0.054 inch first radius toward a direction similar to the terminal bend on the mating side of the connector, a 0.014 inch second radius, and a 0.014 inch third radius. The retainer 9 and the terminals 8 of FIG. 5 are installed into the housing in a "tab down" orientation so that the retainer 9 is adjacent the intermediate wall 13 of the housing 1 and the mating side 50 terminals 8 are angled away from the intermediate wall 13. A retention barb 23 engages the intermediate wall in an interference fit to retain the retainer 9 and terminals 8 within the housing. With specific reference to FIGS. 1 and 4 of the drawings, and for the retainers 9 configured for installation in the second row 53 of the plug receiving cavities, there is shown the terminals 8 bent in the configuration as previously described. The second row retainer 9 terminal configuration is distinguished by a 0.024 inch first radius bent in a direction opposite the direction of the first radius bend 20 for the first row retainers, a 0.014 inch second radius, and a 0.014 inch third radius. The retainer 9 and the terminals 8 of FIG. 4 are installed into the housing in a "tab up" position so that the retainer 9 is adjacent the intermediate wall 13 of the housing 1 and the mating side 50 terminals 8 are angled away from the intermediate wall 13. The top row retainer 9 also comprises the retention barb 23 that engages the intermediate wall in an interference fit. The top row retainer 9 further comprises a retention shoulder 12 which is best illustrated in FIG. 4 of the drawings. The retention shoulder 12 prevents the first shield 17 from shorting to the terminals 8 on a nonmating side 51 of the connector. The retainer 9 is further positioned against an abutment 14 transverse to the intermediate wall 13 of the housing 1 to further position and hold the retainers 9 in the housing 1.

After the retainers 9 and terminals 8 are properly installed into the housing 1, the printed circuit board 4 may be installed into the housing 1 and received by the edge connector 3. Vertical parallel channels in the housing 1 guide the insertion of the printed circuit board 4. The edge contacts 5 on opposite sides of the printed circuit board 4 make contact with resilient contacts in the edge connector 3 when the printed circuit board 4 is fully inserted into the housing 1. The contacts in the edge connector extend to solder tails 7 which are used to solder the edge connector to the receiving printed circuit board. The method of connection to the receiving printed circuit board may be by any known method including the solder tail connection as shown and surface mount connection which is not illustrated in the drawings. The printed circuit board 4 further comprises circuitry which may be either analog, digital, or a hybrid circuit. In the present embodiment, the circuitry takes the form of discrete inductive components placed electrically in series between the edge contacts 5 and metallized area contacts 6 on the printed circuit board 4. The area contacts 6 are on a surface of the printed circuit board 4 are sized and positioned to make electrical contact with the contact point 11 of each terminal 8 when the printed circuit board 4 is fully received by the housing 1 and the edge connector 3. As illustrated, the circuitry on one of the printed circuit boards 4 may be used for two of the plug receiving cavities 2, one each in the first and second rows 52,53 of the modular connector. As one of ordinary skill can appreciate, through receipt and interconnection of the printed circuit board 4 in the edge connector 3, the solder tails 7 are electrically connected to respective terminals 8 of the modular connector with the circuitry 16 electrically interposed therebetween. The curved configurations of the terminals provide for resilient and separable contact between the terminals 8 and the area contacts 6. The separability permits installation and removal of the printed circuit board 4 in the housing 1 for assembly, repair or upgrade of the circuitry 16.

The modular connector further comprises a three piece conductive shield comprising a first shield 17, second shield 18, and third shield 19. The first shield 17 comprises a thin metal sheet disposed on the intermediate wall 13 along the length of the connector. Tabs on either side of the first shield bend orthogonally relative to the intermediate wall 13. The second shield 18 comprises a metal sheet that encloses the nonmating side 51 of the connector including the printed circuit board 4 and circuitry 16 thereon. The third shield 19 encloses the remaining sides of the housing 1, and overlaps the second shield 18 to fully enclose the modular connector while remaining open to each plug receiving cavity 2.

Other advantages of the invention are apparent from the detailed description by way of example, and from accompanying drawings, and the from the scope of the appended claims.

I claim:

1. A modular jack comprising:
    an insulating housing having a first side and an opposite side that is opposite the first side and a transverse side that is transverse to the first side and the opposite side,
    terminals in at least one group in a corresponding plug receiving cavity in the transverse side,
    a printed circuit board substrate inserted through the opposite side,
    circuitry on a surface of the printed circuit board substrate being in series with area contacts on a surface of the printed circuit board substrate, the surface of the printed circuit board substrate extending transverse to the terminals being held in the corresponding plug receiving cavity,
    the terminals making separable contact with the area contacts, permitting installation and removal of the printed circuit board substrate for assembly, repair or upgrade of the printed circuit board substrate,
    an edge connector in the housing, the edge connector being adjacent the first side, and being adapted to receive therein an edge of the printed circuit board substrate, an edge of the printed circuit board substrate being received in the edge connector, the circuitry on the printed circuit board substrate being in series with edge contacts on the edge of the printed circuit board substrate that plugs into the edge connector, solder tails in the edge connector and extending through the first side, the solder tails having resilient contacts making contact with the edge contacts on the printed circuit board substrate, whereby, the surface of the printed circuit board is transverse to the corresponding plug receiving cavity during installation and removal of the printed circuit board substrate.

2. A modular jack as recited in claim 1, and further comprising: a second group of said terminals is received in a second corresponding plug receiving cavity in the transverse side.

3. A modular jack as recited in claim 1, and further comprising:

a second group of said terminals is received in a second corresponding plug receiving cavity in the transverse side, the plug receiving cavities being upside down relative to each other along an intermediate wall of the housing, respective said groups of said terminals being held by respective plastic retainers along the intermediate wall, the plastic retainers being upside down relative to each other the terminals of each group angling away from the intermediate wall and extending into the corresponding plug receiving cavity, and bent springs on the terminals making separate contact with respective area contacts on the surface of the printed circuit board substrate.

4. A modular jack as recited in claim 3, and further comprising: the bent springs being bent in the same directions relative to one another.

\* \* \* \* \*